Oct. 20, 1936.        J. J. THAYER         2,057,698
COUPON FEEDING MACHINE
Filed Jan. 11, 1932        9 Sheets—Sheet 1

Inventor:
Josephus J. Thayer.
By
Jones, Addington, Ames & Seibold.
Attorneys.

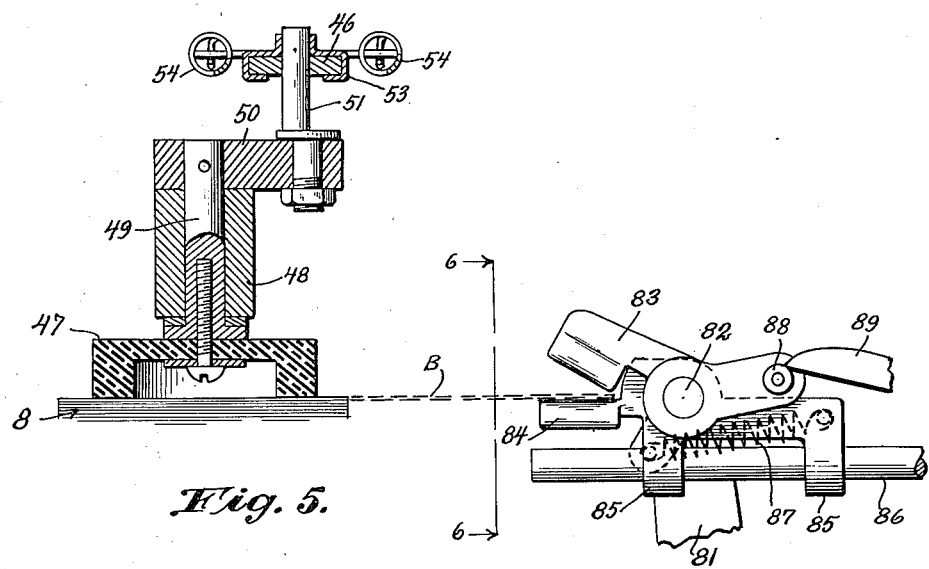
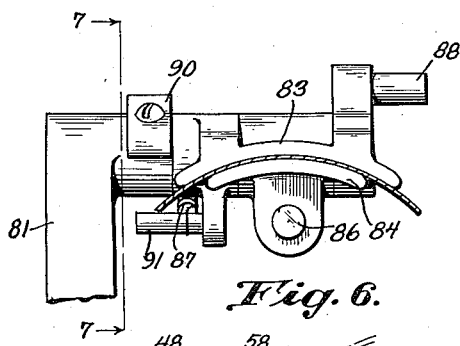
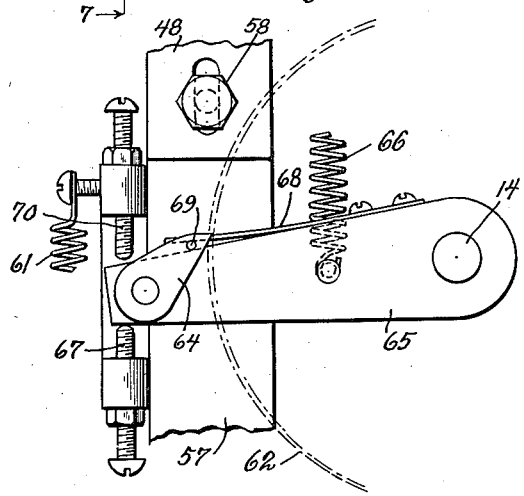
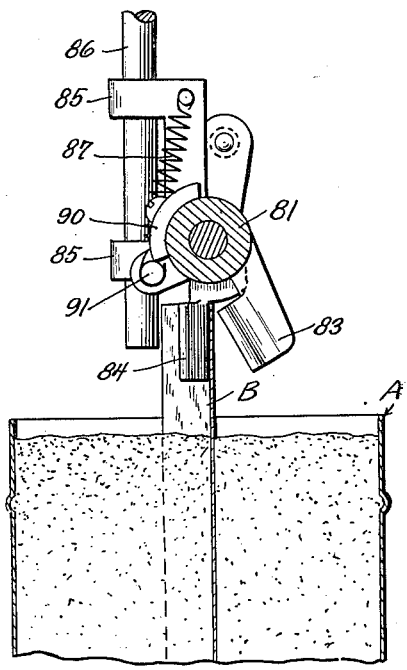

Oct. 20, 1936.  J. J. THAYER  2,057,698
COUPON FEEDING MACHINE
Filed Jan. 11, 1932   9 Sheets-Sheet 9

Inventor:
Josephus J. Thayer.
Jones, Addington, Ames & Seibold.
Attorneys.

Patented Oct. 20, 1936

2,057,698

UNITED STATES PATENT OFFICE 2,057,698

COUPON FEEDING MACHINE

Josephus J. Thayer, Hollywood, Ill., assignor to
J. L. Ferguson Company, a corporation Application January 11, 1932, Serial No. 585,854

23 Claims. (Cl. 226—2)

My invention relates to coupon feeding and handling devices and more especially to devices in which coupons or other relatively small paper sheets are automatically removed from a stack of the same and inserted in filled containers.

It is often desired to insert coupons or other advertising matter in containers, especially in containers in which pulverulent material of various kinds is packed for the retail trade. If the coupon is inserted before the container is filled, it is crushed by the material and is not found by the customer until the container is empty. Other reasons connected with automatic handling, filling and sealing of containers make it desirable to insert the coupon after filling.

The present machine and method is intended to insert the coupon in such a manner that it will not be crushed and so that it may be easily removed when the container is opened. The easy removal of the coupon before the material in the container is used is especially desirable because the coupon frequently bears recipes for the use of the material. Therefore, the coupon should be so placed in the material that it can be readily grasped and withdrawn without unduly disturbing the material in the container.

To this end, it is desirable that the coupon be imbedded in the material to a minimum depth and preferably parallel to the axis of the container.

In my invention I have incorporated the necessary elements for the practice of a method to accomplish the above desirable results, and I have provided a machine capable of receiving the coupons in bulk, preferably in a stack, and automatically removing and distorting consecutive coupons in a manner to stiffen them and then inserting the stiffened coupons into the material in the filled containers.

The containers, for the purposes of illustration only, will be hereinafter referred to as containing pulverulent material. The machine as hereinafter described may be adapted for inserting coupons in either filled or unfilled containers and for delivering and imbedding coupons in material in the containers during either the normal or the interrupted movement of the containers on an ordinary conveyor.

Broadly, the invention provides improved means for removing consecutive coupons from a stack and inserting them in consecutively moved filled or unfilled containers.

A further object is to provide efficient means for feeding a stack for the consecutive removal of coupons therefrom.

I also provide means for frictionally positioning consecutive coupons for removal from the stack.

A further desirable feature comprises means for removing and distorting the coupon and retaining the distortion during the process of delivering the coupon to and inserting it in a filled container.

Considerable difficulty has previously been encountered in attempting to remove individual coupons from a stack of the same, and an especially important feature of the present invention is the provision of means for engaging and positioning consecutive coupons from the end of a stack of the same whereby the coupon may be readily engaged and removed therefrom at a speed corresponding to the speed of moving containers thereby.

I also provide a suitable means for intermittently moving the stack of coupons with relation to the coupon positioning and removing means whereby a substantially constant pressure of each consecutive coupon may be maintained against the coupon positioning means, and whereby the positioning means may efficiently operate to move each consecutive coupon.

Further objects will be apparent from the specification and the claims.

In the drawings:

Fig. 5 is a side elevation of the coupon positioning and removing means, the positioning means being shown in vertical section;

Fig. 6 is an end elevation of the coupon gripping and removing means after the coupon has been gripped and distorted, the coupon being shown in section substantially on a line corresponding to line 6—6 of Fig. 5;

Fig. 7 is a detail sectional view of the coupon gripping means taken on a line substantially corresponding to line 7—7 of Fig. 6, the gripping means being illustrated in its lowered position after the coupon has been inserted in the container and the gripping means opened to release the coupon;

Fig. 8 is a detail side elevation of the ratchet means for intermittently moving the stack of coupons;

Figure 1:
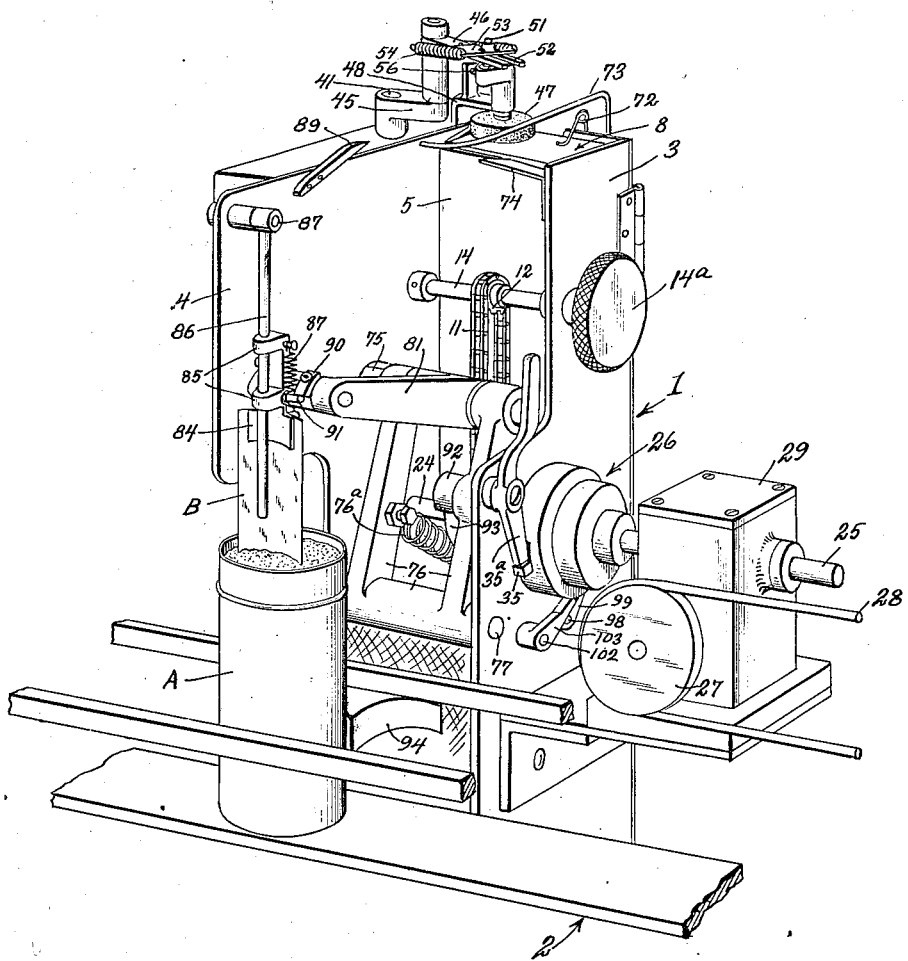
Figure 1 is a perspective view of a machine embodying my invention and illustrating the machine in operation with a coupon partially inserted in a filled container.

Referring to the drawings in detail, in the embodiment illustrated I have disclosed a coupon handling, distorting and inserting machine which may be driven from any suitable power source, and which includes a driven main shaft together with a clutch for intermittently connecting the shaft with the driving means.

Other means are provided, all of which are driven from the main shaft, for intermittently moving a stack of coupons toward a friction means operable for positioning consecutive coupons on the stack, means for engaging and distorting the consecutively positioned coupons and for inserting these coupons consecutively into consecutively movable filled containers as the containers pass the machine on a suitable conveyor.

An extremely simple and efficient means is provided for separating each consecutive coupon from the stack and broadly comprises a friction member, preferably a rubber cup arranged to descend upon the top of the stack of the coupons and to turn a desired portion of a revolution about its axis and then raise from the stack. The descending rubber cup or friction member contacts with the coupon at one side of the center and in making the partial revolution the engaged coupon turns with the cup, due to the fact that the co-efficient of friction is somewhat greater between the engaged coupon and the friction member than it is between the engaged coupon and the one below it.

In the turned position the coupon overhangs the stack and a suitable gripping means engages the overhanging portion of the coupon which is thereby distorted along a longitudinal line and stiffened by this distortion. The gripping means then moves to a position to insert this stiffened coupon longitudinally into the pulverulent material in a container, or the gripping means may be arranged to feed the positioned coupon to a suitable folding mechanism, also illustrated, which may be arranged to fold the coupon into a projectile and to propel the folded coupon longitudinally into a container.

Briefly, the movement of a coupon through the preferred structure illustrated is as follows:

A stack of coupons is moved upwardly in a magazine, the top coupon is turned horizontally through an angle of substantially 90°, it is then engaged by gripper, is pulled horizontally along its axis until it clears the magazine and then swung downwardly to a vertical position and moved substantially straight downward into the material in the can.

The embodiment illustrated comprises a box-like frame 1 which may be supported in any suitable manner adjacent a moving conveyor 2; the frame 1 comprises side plates 3 and 4 and a transverse partition 5 forming the front wall of a coupon magazine 6; a door 7 is hinged as illustrated to the side plate 3 for the purpose of allowing a stack of coupons 8 to be inserted in the magazine. The door is retained in position by means of a spring catch 9 on the side plate 4.

Figure 4:
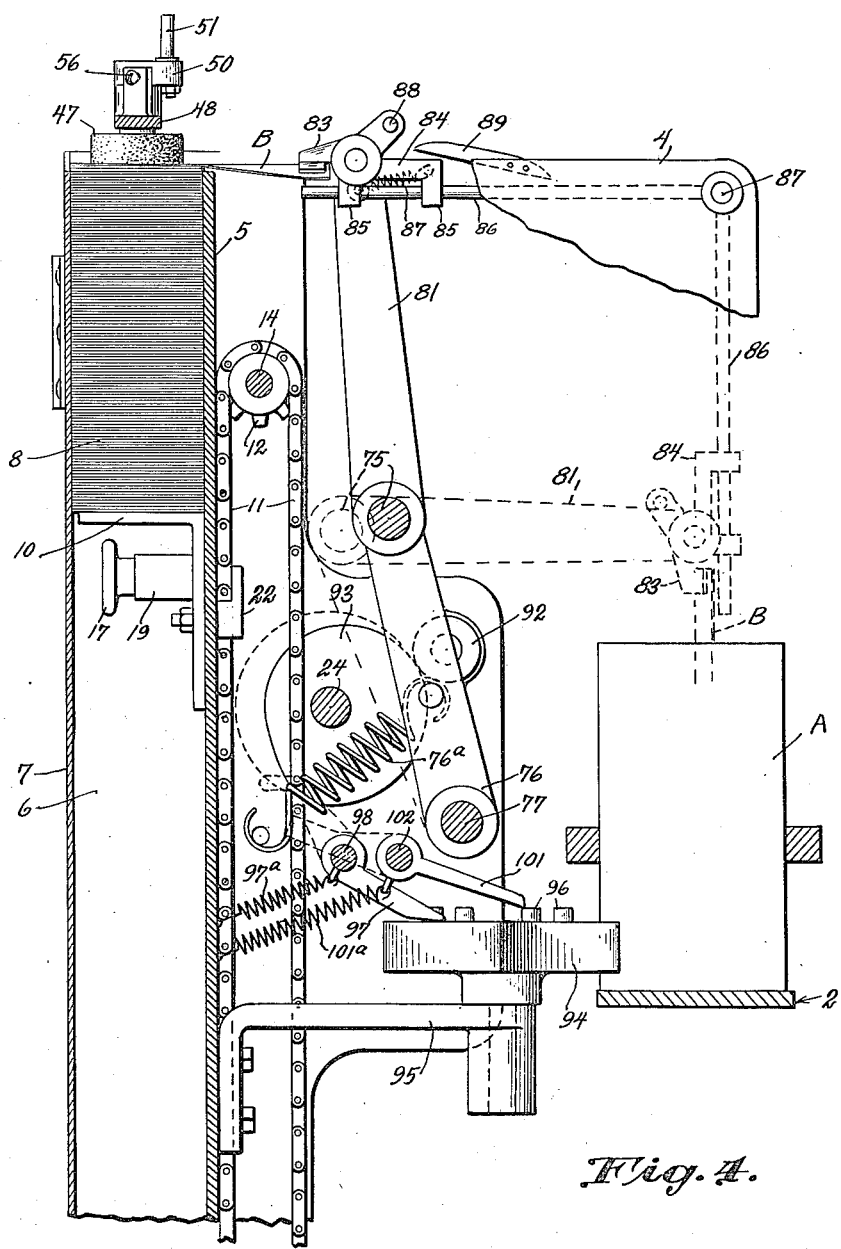
Fig. 4 is a transverse sectional view taken on a line substantially corresponding to line 4—4 of Fig. 2 and illustrates the mechanism in a position where the coupon has been gripped and partially distorted ready for removal from the stack.
Figure 12:
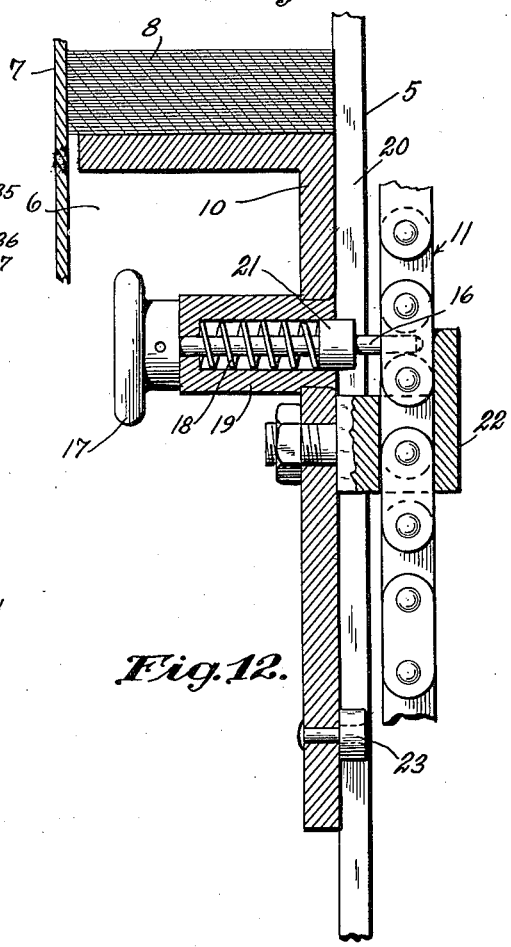
Fig. 12 is a detail sectional elevation through the stack carrier, and means for retaining the carrier in adjustable engagement with the elevator chain.
Figure 13:
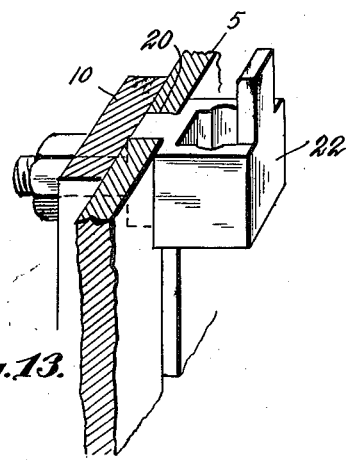
Fig. 13 is a detail perspective view of the stack carrier guide and chain retaining device.

A stack of coupons 8 is supported on a movable elevator bracket or carrier 10 which latter is adjustably secured to an elevator chain 11 as illustrated in Figs. 4 and 12. The chain 11 is mounted on sprockets 12 and 13 on transverse shafts 14 and 15, respectively. The shaft 14 is arranged to be intermittently moved by means which will be later described to raise the elevator carrier 10 and the stack of coupons supported thereon.

The means for adjustably securing the elevator bracket 10 to the chain 11 is illustrated in detail in Fig. 12 and comprises a slidable pin 16 which is longitudinally movable by means of a handle 17, and which is retained in chain engaging position by a spring 18 in the outwardly extending lug 19 of the shaft 10. The transverse partition 5 is provided with a vertical slot 20 in which an enlarged portion 21 of the engaging pin 16 is guided. The chain 11 is retained in a position to be engaged by the pin 16 by means of a guide block 22 which extends through the slot 20 and is secured to the elevator bracket 10. This block 22 also forms a retaining guide for the elevator bracket 10 in the slot 20. A roller 23 is mounted on the lower end of the bracket 10 and is engaged in the slot to provide a further guide means for the bracket.

Whenever it is necessary to renew the supply of coupons in the magazine, the door 7 is opened and the pin 16 is pulled out of its engagement between the links of the elevator chain, the bracket 10 may then be lowered and attached to the chain at any desired point and the magazine filled with coupons.

A hand wheel 14a on the shaft 14 may be used for manually elevating the stack when desired.

The mechanism for the removal of consecutive coupons from the stack 10 and their insertion in the containers comprises a transverse driven shaft 24 and a drive shaft 25 in alignment therewith and arranged to be operably connected by means of a clutch 26. The drive shaft 25 may be driven from any suitable source of power through a pulley 27 and a suitable belt 28. The pulley 27 is preferably connected to the shaft 25 through any suitable transmission such as an ordinary pair of spiral gears which may be mounted in a transmission box 29, which latter also forms a bearing for the shaft 25.

Figure 9:
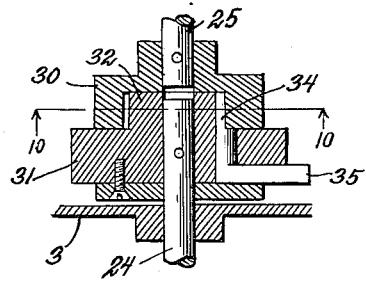
Fig. 9 is a transverse sectional view taken through the drive shaft clutch mechanism with the clutch illustrated in disengaged position.
Figure 10:
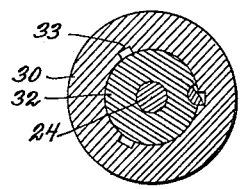
Fig. 10 is a detail sectional view through the clutch and taken on a line corresponding to line 10—10 of Fig. 9, but with the clutch shown in engaged position.
Figure 11:
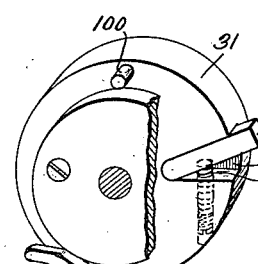
Fig. 11 is a perspective view of the star wheel controlling mechanism.

As illustrated in Figs. 9, 10, and 11, the clutch 26 comprises a driving member 30 secured to the drive shaft 25 and a driven member 31 secured to the driven shaft 24. The driven member 31 is provided with a reduced cylindrical portion 32 extending into a suitable concentric bore in the body of the driving member 30. The bore is machined for a running fit on the cylindrical portion 32 and is provided with radially disposed longitudinal slots 33 arranged to be engaged by a clutch pawl 34 to lock the driving and driven members together to drive the shaft 24.

The clutch pawl 34 is oscillatably mounted in the driven member 31 and provided with an outwardly extending arm 35 which is arranged to operate in an angular slot 36. A spring 37 tends to hold the pawl in clutch engaged position. The engaging portion of the pawl 34 extends into the bore of the driving member and adjacent the wall thereof, and is cut away on a radius substantially equal to the radius of the cylindrical portion 32 of the driven member so that when the pawl is in the position illustrated in Figs. 10 and 11, the pawl will engage in one of the slots 33 and cause the shaft 24 to be driven thereby, but when the pawl arm 35 is held in a position to resist the pressure of the spring 37, the clutch will be disengaged. A lever 35a is pivoted on the side plate 3 in a position to be manually operable to engage the arm 35 when desired to thereby disengage the clutch. By this means, the machine may be stopped at any time when desired by the operator. During the normal operation of the machine this handle is not used.

Figure 2:
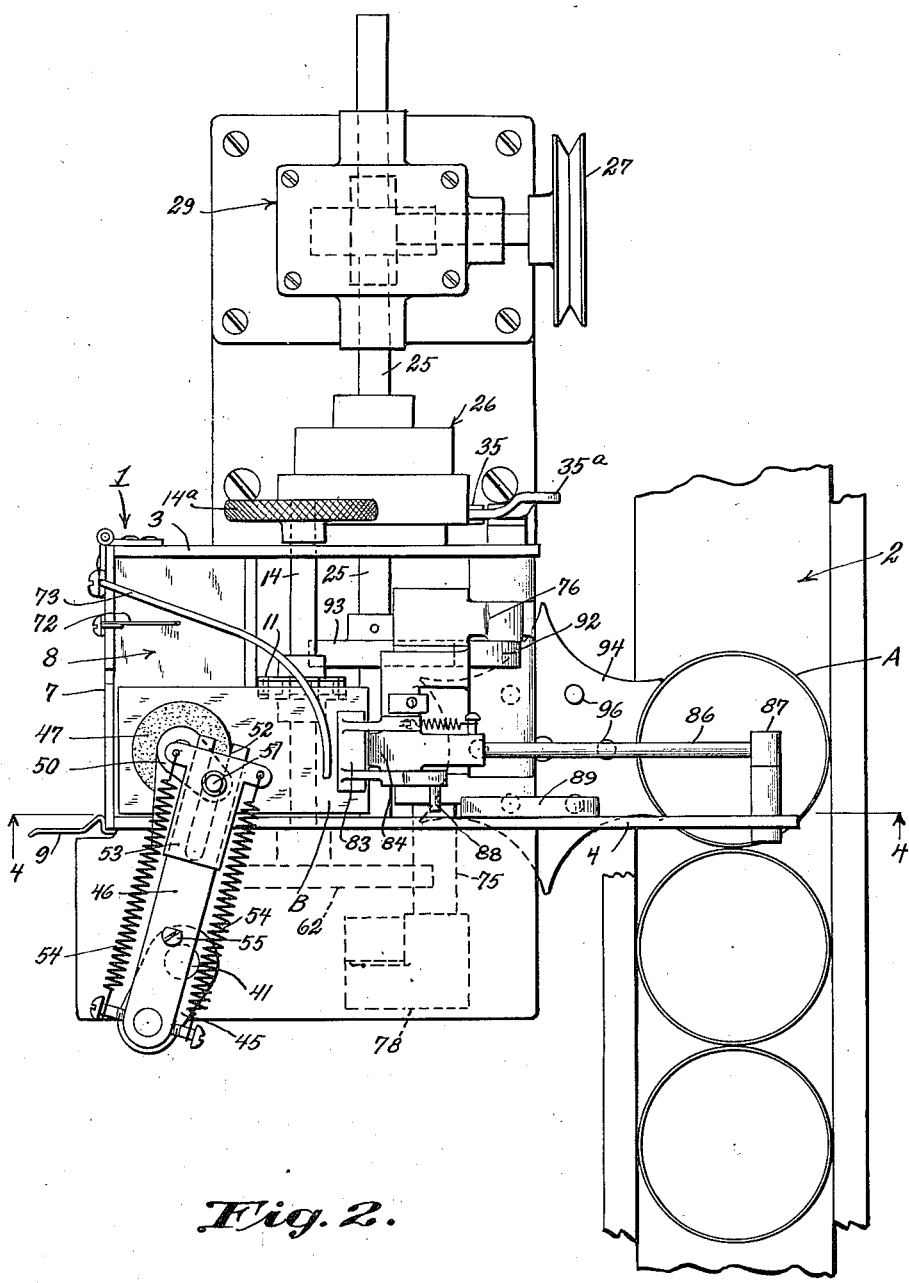
Fig. 2 is a top plan view of the machine illustrated in Fig. 1.

A gear 38 (Fig. 3) is secured to the drive shaft 24 and is in mesh with a gear 39 rotatably mounted on a stub shaft 40 and in a position to drive a vertical shaft 41 through the beveled pinions 42. The shaft 41 is rotatably mounted in suitable bearing brackets 43 and 44, and is provided at its upper end with a crank arm 45 having a connecting rod 46 pivoted thereon (Fig. 2). This connecting rod and cooperative driven mechanism is for the purpose of partially rotating a friction member 47 which latter is pivotally mounted on the overhanging bearing portion of a slidable member 48 and in a position to engage the topmost coupon of the stack 8.

The friction member 47 is preferably made of specially prepared rubber in the form of an inverted cup but may be of any suitable similar friction material. The member 47 is not intended to act as a vacuum cup but as a friction means only.

The friction member or cup 47 is secured to a short vertical shaft 49 as illustrated in Fig. 5 and is provided with a crank arm 50 having a crank pin 51 thereon. This crank pin is retained in a slot 52 in the connecting rod 46 (Fig. 2), by means of a slidable bearing 53 mounted on the connecting rod 46. Springs 54 are connected to the slidable bearing 53 in a position tending to move the friction cup 47 in a clockwise direction. The connecting rod 46 is provided with a stop 55 which engages the slidable bearing member 53 during each rotation of the shaft 47. This engagement causes the friction cup to be rotated in an anti-clockwise direction during a part of a revolution of the shaft 41. The remainder of the revolution will move the friction cup 47 in a clockwise direction until the crank arm 50 engages an adjustable stop 56 on the slidable member 48.

The mechanism is so arranged that the slidable member 48 is raised and lowered slightly during each revolution of the shaft 41 and each corresponding partial revolution of the rubber cup 47. When the slide 48 is lowered, the friction cup 47 will engage the stack and the topmost coupon will be turned approximately 90°, as shown in Fig. 2, during the following rotary movement of the friction cup. The slidable member 48 then raises the cup slightly to release the coupon which is then removed by a mechanism which will be described later, and the operation of positioning and removing coupons is repeated as long as coupons remain in the magazine and containers are passed thereby, the friction cup member being raised, lowered and rotatably oscillated during each operation.

The slidable member 48 is oscillatably mounted in the bearing bracket 43 and provided with an extension 57 to which it is adjustably secured by means of machine screws 58. The extension member 57 is slidably mounted in the bracket 44 and provided with a roller 59 arranged to be engaged by cam 60 which is secured to the gear 39. It will be obvious that at each revolution of the gear 39, the friction cup will be raised through the mechanism just described. During a part of the revolution of the cam 60, the roller 59 is not engaged thereby and if the stack of coupons 8 is supported at the proper elevation, the friction cup 47 will engage and rest upon the topmost coupon with a frictional engagement controlled by a spring 61 secured to the oscillatable extension member 57.

In order that the stack of coupons may be intermittently raised to maintain the topmost coupon always at the desired height and in the position to be engaged by the friction cup, a ratchet wheel 62 is secured to the elevator chain shaft 14 and retained in a position to support the coupons by means of a dog 63.

This ratchet wheel is provided with comparatively fine teeth and when the stack of coupons has been lowered sufficiently by the removal of coupons therefrom, to allow the cam roller slide member 57 to lower below a predetermined point, a ratchet dog 64 pivoted on a movable arm 65 which latter is retained in operative position by a comparatively weak spring 66, will be moved downward sufficiently to engage below a tooth of the ratchet wheel 62, and during the next upward movement of the cam roller member 57 the ratchet dog arm 65 will be raised by an adjustable stop screw 67 secured to the cam roller member 57. This upward movement will cause the elevator chain shaft 14 to be moved to raise the stack of coupons and the continued operation of the device will cause the stack to move upwardly intermittently as the coupons are removed, and retain the stack always in a position so that the frictional engagement and the rotation of the rubber cup will rotate the topmost coupon. The ratchet dog 64 is held in position by means of a spring 68 engaging a pin 69 thereon.

An adjustable stop screw 70 is secured on the cam roller slide member 57 in a position to force the ratchet arm 65 downwardly in case the spring 66 fails to operate. It will be noted that by the adjustment of the stop screws 67 and 70 and the accurate adjustment of the cup supporting member 48 by means of the machine screws 58, a substantially constant pressure may be maintained on the stack during the engagement and rotation of coupons by the friction member.

As before stated, the top coupon will turn through substantially 90° due to the fact that the co-efficient of friction is somewhat greater between the top coupon and the friction cup than it is between the top coupon and the adjacent one. However, the tendency for more than one coupon to turn with the cup is overcome by an inclined obstruction 71 forming an upward extension of the side plate 4 and over which the top coupon will have sufficient torque to bend itself but over which the second coupon will not be able to climb. This action is further aided by a light spring 72 secured to the door 7 in a manner to apply a yielding force on the top coupon but from under which the coupon will bend or twist itself and allow the pressure to bear directly upon the second coupon.

A curved guide member or wire 73 is also secured in a position to prevent the top coupon from rising out of a horizontal plane and to cause it to retain a position when rotated where it may be gripped by a suitable means for removing it from the stack. An angular guide 74 is positioned beneath the path of the coupon to guide it in a horizontal plane.

In order that the coupons may be consecutively removed from the stack as fast as they are rotated to the desired position, a shaft 75 is mounted on the arms of an oscillatable bearing member 76 which latter is pivoted at 77. The shaft 75 is provided with a crank arm 78 (Fig. 3) which latter is connected to a crank pin 79 on the driven gear 38 by means of a connecting rod 80 so that during each revolution of the driven gear 38, the shaft 75 will be oscillated back and forth through substantially 90°.

An arm 81 is secured to the shaft 75 and oscillated therewith from a substantially vertical position to a substantially horizontal position and vice versa. A gripping means is pivoted on a stub bearing 82 on the arm 81 and comprises a movable jaw 83 and a relatively fixed jaw 84. The fixed jaw 84 is provided with downwardly extending bearings 85, slidably mounted on a guide rod 86 pivoted at 87 on the side frame 4.

The gripping jaws are illustrated in detail in Figs. 5, 6, and 7, the jaws being normally retained in closed position by means of a spring 87. The gripping portion of the jaws 83 and 84 are curved in a manner to distort the coupon when it is gripped as shown in Fig. 6. The movable jaw 83 is provided with a rearwardly extending arm having a roller 88 thereon which is positioned to engage a cam member 89 during the upward movement of the arm 81.

The cam member 89 is secured to the side plate 4 and so positioned that as the arm rises, the engagement of the roller 88 will cause the jaws to be opened as indicated in Fig. 5, to receive the end of a coupon as it is turned on the stack, and the continued movement of the arm 81 will cause the roller 88 to become disengaged from the cam 89, and the spring 87 will then cause the coupon to be engaged by the gripping jaws and distorted thereby.

During the continued operation of the machine, the arm 81 moves downwardly through the position indicated in Fig. 1 to the position indicated in Fig. 7 in which latter lowered position, the jaws are opened by means of a block or lug 90 on the arm 81. This block 90 engages a pin 91 on a downwardly extending arm of the jaw 83, thereby causing the jaws to be opened to release the coupon.

During the back and forth movement of the arm 81, the position of the gripping jaws is determined by the rod 86 which causes the jaws to move from a horizontal to a vertical position, as shown in Figs. 1 and 7. The continued downward vertical movement of the jaws causes the coupon to be forced into the pulverulent material in the container.

A roller 92 (Figs. 1 and 4) is mounted on the oscillatable bearing member 76 and in engagement with a cam 93 on the driven shaft 24 and is retained in engagement by means of a spring 76a.

During each downward movement of the arm 81, the shaft 75 and the arm 81 thereon, are moved rearwardly in order to bring the downwardly moving coupon into alignment with the container so that the continued movement will insert it therein.

It will be obvious from the previous description, that if suitable containers are consecutively moved by the conveyor 2 to the position shown in Fig. 1, and the clutch 26 is operated in synchronism therewith, consecutive coupons will be removed from the stack and inserted in consecutive containers.

In order that each container A may be retained in a position to receive a coupon B, a star wheel 94 is rotatably mounted on a bracket 95 adjacent the conveyor. The star wheel is arranged to be engaged by consecutive containers and is provided with upwardly extending pins 96 corresponding in number and position to the engaging portions of the star wheel.

A star wheel release dog 97 is secured to a transverse shaft 98 which latter is provided with an upwardly extending arm 99 (Figs. 4 and 11). The arm 99 is located in the path of a pin 100 on the driven clutch member 31. The dog 97 is controlled by a spring 97a and is in the path of the star wheel pins 96 so that when the driven clutch member 31 is rotated the pin 100 will engage the arm 99, thereby raising the dog 97 and allowing the star wheel to be moved by a succeeding container until the dog 97 is engaged by a succeeding star wheel pin 96.

In order to prevent the operation of the machine when there is no container in a position to receive a coupon, a second pawl 101 is secured to a transverse shaft 102 which latter is provided with an upwardly extending arm 103 arranged to rise into the path of the arm 35 of the clutch dog and to disengage the clutch when the dog 101 drops between the pins 96. The dog 101 is controlled by a spring 101a.

It will be noted that by this arrangement and during the rotation of the clutch, the pin 100 will engage the arm 99 to raise the dog 97 and release the star wheel. As the star wheel is released, the friction of the containers on the conveyor will cause them to rotate the star wheel and the pin previously engaged by the dog 97 will pass under the dog which will then engage the next pin during the rotation of the star wheel.

During the movement of the star wheel from the disengagement of the dog from one pin and its engagement with another, the clutch control dog 101 will drop off from the top of its pin 96 and the arm 103 will then be in a position to disengage the clutch by its engagement with the dog 35, and if the friction of the container on the conveyor is not sufficient to move the star wheel and raise the dog 101, the clutch will remain disengaged and the machine inactive.

However, if the star wheel is moved by a succeeding container, to a position to cause the engagement of the dog 97 by a succeeding pin, the dog 101 will be again raised by a succeeding pin before the disengagement of the clutch can be accomplished and the machine will continue in operation.

The cycles described will continue indefinitely as long as containers are being fed consecutively by the conveyor and will be stopped only when there are no containers thereon, or when the friction of a container on the conveyor is insufficient to move the star wheel.

In the machine previously described, the coupons are distorted longitudinally and thereby stiffened sufficiently so that they may be forced into the pulverulent material in the containers. The mechanism heretofore described serves to stiffen said coupons by a distortion or partial bending thereof. A different kind of stiffening within the broad definition thereof comprises varying the degree, or completing the distortion, of the coupon to fold the same one or more times as desired.

In the copending application of John L. Ferguson, Serial No. 439,886, Patent No. 1,909,050, the idea of coupon distortion to facilitate imbedded feed of coupons is broadly claimed. The mechanism there utilized to perform said method of feeding is one wherein the coupons or labels are folded or otherwise distorted transversely and formed thereby into a projectile which may be inserted or propelled by a suitable means into the container. This is especially desirable in inserting coupons into relatively small containers. Figs. 14 to 19, inclusive, therefore illustrate a modified structure in which an embodiment of my invention is incorporated in a machine in connection with a suitable folding and inserting device, such as that described and claimed in the co-pending application of John L. Ferguson, Serial No. 439,886, Patent No. 1,909,050.

Figures 14, 15:
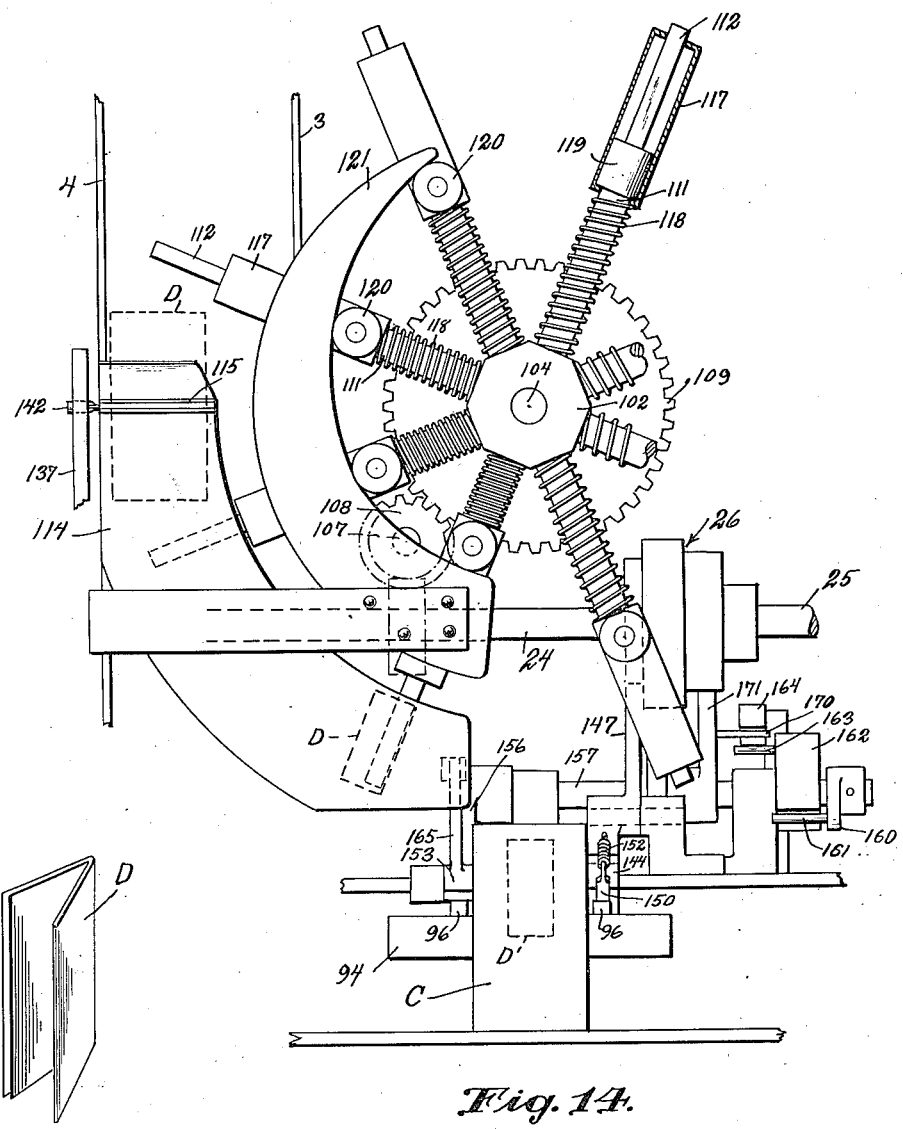
Fig. 14 is a front elevation of the folding mechanism and star wheel control means adapted for use with a modified embodiment of my improved coupon handling mechanism.
Fig. 15 is a perspective view of a coupon after being folded by means of the mechanism illustrated in Fig. 14.

The embodiment illustrated in this modified form comprises a shaft 104 supported in suitable bearings in transverse relation to the driven shaft 24 and the drive shaft 25, as shown in Fig. 14. This shaft 104 is rotated in a desired synchronized relation from the driven shaft 24 by means of a spiral pinion 105 (Fig. 16) and a cooperating spiral pinion 106 on a transmission shaft 107.

The shaft 107 is also provided with a pinion 108 meshing with a gear 109 on the shaft 104. An octagonal member 110 is secured to the shaft 104 and provided with a plurality of radially extending arms 111, these arms terminating in folder blades 112. The folder blades are in alignment with a channel 113 in a vertically disposed arcuate coupon-folding guide member 114, a transverse guide member 115 provides an intersecting transverse channel 116, which is arranged to receive and fold a coupon.

During the rotary movement of the shaft 104, the blades 112 will be moved consecutively through the vertical arcuate channel 113 and each blade will engage successive coupons as they are inserted and folded in the transverse channel 116. The coupons, as they are inserted in the channel 116, are folded along a transverse axial line and each consecutive blade 112 will engage its respective folded coupon, and fold it a second time by forcing it into the channel 113. The coupon will thereby be folded substantially as illustrated in Fig. 15 with the blade 112 between the folds thereof.

The continued movement of each arm 111 will carry each consecutive coupon through the vertical guide member 114 and into alignment with one of the containers C (Fig. 14). The movement of the containers on the conveyor may be synchronized with the movement of the arms, if desired, in such a manner that each coupon will be inserted in a moving container. However, in the construction illustrated, I have disclosed a suitable means for interrupting the movement of the containers while the coupon is being inserted. This interrupting mechanism will be described later.

In order to insert the folded coupons into containers and to project them with sufficient force to imbed the coupons in the pulverulent material, each of the arms 111 is provided with a telescopic member 117 which is normally pressed outwardly by a spring 118. The outward movement of each telescopic member is limited by a shoulder 119 on its respective arm.

In order to retract the telescopic members 117 to allow the blades 112 to enter the coupon-folding arcuate guide member 114, rollers 120 are mounted on each telescopic member and arranged to be engaged by cams 121, which latter are mounted on suitable brackets and positioned to retract the telescopic members and retain them in retracted position during the movement of the blades 112 into and through the arcuate guide member 114. The cams 112 are so shaped and positioned with relation to the guide member 114 that the rollers 120 are released substantially simultaneously with the release of the coupon from the channel member 114, and the energy stored in the spring 118 forces the telescopic member 117 outwardly, thereby causing the folded coupon to be projected from the blade with sufficient force to imbed it in the material in the container, the containers being consecutively positioned to receive the coupons or their movement being synchronized with the consecutive movements of the arms 111 as described.

Figure 16:
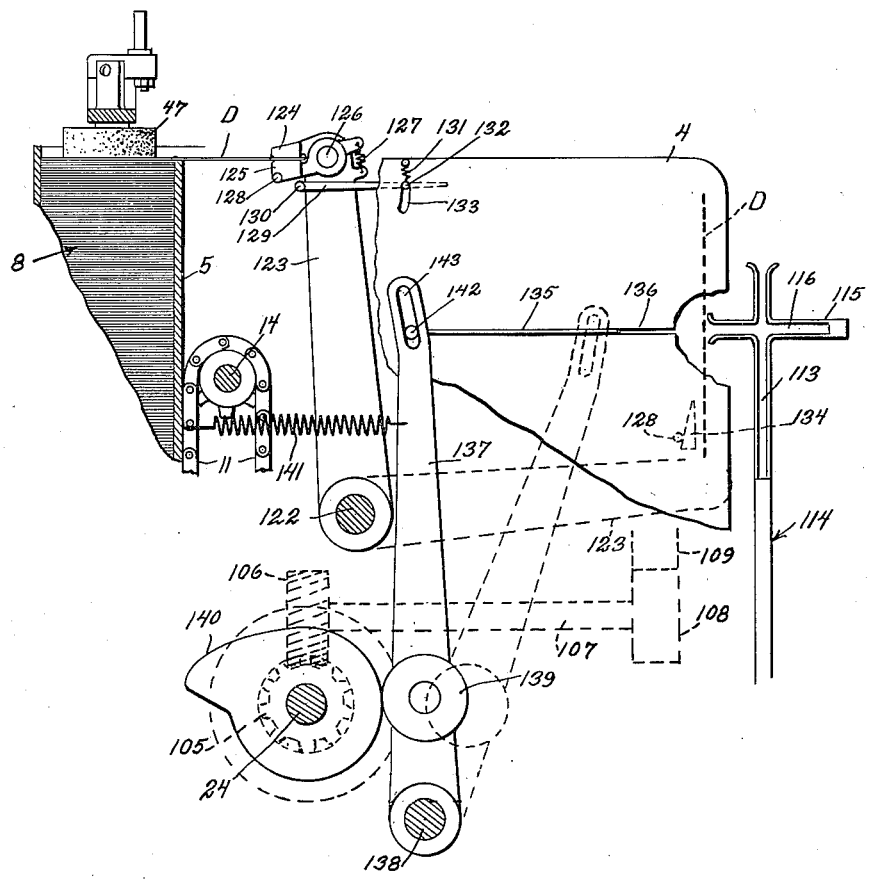
Fig. 16 is a detail side elevation partially in section, of the coupon removing and handling mechanism as adapted for use with a suitable folding device such as illustrated in Fig. 14.

The slightly modified mechanism for removing the coupons from the stack and inserting them into the transverse channel 116, in a position to be engaged by the blades 112, is illustrated in Fig. 16 and comprises an oscillatable shaft 122 which corresponds to the previously described shaft 75, except that it is not laterally movable. An upwardly extending arm 123 is secured to this shaft and provided with an integral gripping jaw 124. A movable gripping jaw 125 is pivoted at 126 to this arm in a position to cooperate with the jaw 124 for gripping the coupon after it has been positioned by the friction cup 47. The jaw 125 is yieldingly retained in gripping position by means of a spring 127 and is provided with an outwardly extending pin or projection 128, whereby the jaw may be automatically opened to receive or to release a coupon.

Figure 3:
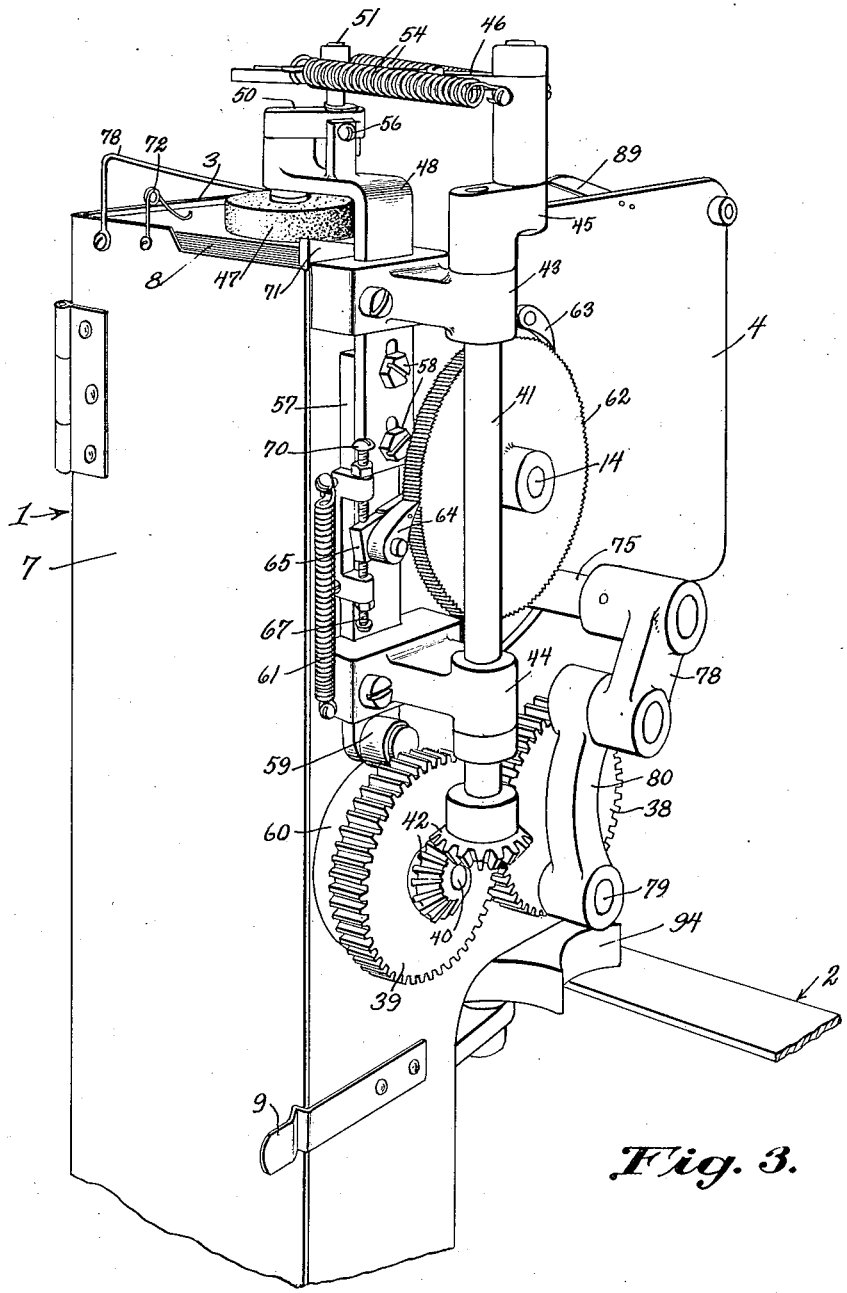
Fig. 3 is a perspective view of the machine illustrated in Figs. 1 and 2, with the side cover removed to disclose the controlling and operating mechanism.

The mechanism, for controlling the operation of the stack and friction positioning means and for controlling the operation of the shaft 122, is exactly the same as disclosed in Fig. 3, the arm 78 being secured to the shaft 122 instead of the shaft 75 previously described, whereby the shaft 122 is oscillated once for each revolution of the driven shaft 24 and the gear 38 thereon.

During the normal operation of the machine, as previously described, the gripper arm 123 is moved to the position shown in dotted lines (Fig. 16), in order to carry a coupon D from its angular position on the top of the stack 8 to the dotted line position in front of the transverse folding channel 116.

In the present instance, the gripper jaws are preferably flat, that is they are arranged to prevent the distortion of the coupon before it has been inserted in the folding-channel 116. During the upward movement of the arm 123, the pin 128 on the gripping jaw 125 engages a cam member 129 which is pivoted at 130 on the side plate 4. This cam member 129 is normally retained in substantially horizontal position by means of a spring 131, secured to a pin 132 which extends through and is engaged in a slot 133 in the side plate. It will be obvious that when the pin 128 engages the fixed end of the cam member 129, the jaw 125 will be opened sufficiently to receive the end of the horizontally rotating coupon D, and as soon as the coupon D is in aligned position, the continued movement of the arm 123 will release the pin 128 from the cam member and the jaw will close, thereby gripping the coupon. The arm 123 will then move outwardly to the dotted line position indicated and the pin 128 will pass over the top of the cam member 129, the spring 131 allowing the end of the cam member to move downwardly out of the path of the pin. As the gripper arm and the coupon D therein approaches the dotted line position indicated, the pin 128 engages a fixed cam plate 134 secured to the side plate 4, and the gripper jaws will thereby be opened to release the coupon. As soon as the coupon D arrives in the vertical position illustrated by the dotted lines (Fig. 16), a folding member or slide 135, which is guided in a slot 136 in the side frame, is moved forwardly into the transverse channel 116 engaging the coupon on a transverse axial line and folding the coupon into the channel 116 and into the path of the folding blades 112, whereupon the slide is immediately withdrawn leaving the folded coupon in the channel.

The operation of moving a coupon from the stack and folding it into the channel 116 in the path of the blades is accomplished during the movement of each consecutive blade 112 into the vertical channel 113, and each consecutive coupon is thereby folded a second time by its corresponding consecutive blade 112.

In order to move the transverse coupon-folding slide 135 in synchronous relation with the movement of the coupon-handling mechanism, an upwardly extending arm 137 is pivoted at 138. A roller 139 is mounted on this arm and is engaged by a cam 140 on the driven shaft 24. A spring 141 retains the roller in engagement with the cam. The arm 137 is connected to the slide 135 by means of a pin 142 engaged in a slot 143 in the arm. By means of this construction, the slide 135 is moved forward to fold each consecutively positioned coupon into the transverse channel 116.

It sometimes occurs that the friction of a single container on the conveyor 2 is not sufficient to move the star wheel 94 to thereby trip the clutch controlling mechanism, and I therefore provide a so-called non-tripping mechanism, as illustrated in Figs. 14 and 17 to 19, inclusive. The object of this mechanism is to control the operation of the clutch in such a manner as to prevent the insertion of more than one coupon in a container.

The clutch controlling mechanism comprises a star wheel release dog 144 arranged to be engaged by the consecutive pins 96 on the star wheel. This engagement retains each consecutive container in fixed relation to the mechanism until a coupon has been inserted therein. The dog 144 is pivotally mounted at 145 and provided with an outwardly extending lug arranged to engage an adjustable stop screw 146, whereby the downward movement of the dog may be limited as desired. The dog 144 also is provided with an upwardly and rearwardly extending cam arm 147, which is located in the path of a pin 148 on the driven clutch member 31, so that with each revolution of the clutch, the pin 148 will engage the cam arm 147 and the dog 144 will be raised out of engagement with one of the star wheel pins 96 and be immediately released to engage a succeeding pin as the star wheel is moved by the passing container.

The dog 144 is normally held in the path of the pins by means of a spring 149. The dog is provided with an auxiliary safety pawl 150 pivoted at 151, and a spring 152 normally tends to move the lower end of the safety pawl outwardly when the dog 144 is raised out of engagement with the star wheel pin. This safety pawl 150 is for the purpose of engaging on top of the pin when the dog 144 is raised and preventing the re-engagement of the dog behind its previously engaged pin 96, in the event that the star wheel is not moved by a container engaged therewith.

The outward movement of the lower end of the safety pawl 150, when the dog 144 is raised, allows the dog to be retained on the top of the previously engaged pin until the friction of the containers on the conveyor is sufficient to move the star wheel and allow the dog to engage a succeeding pin.

Figure 17:
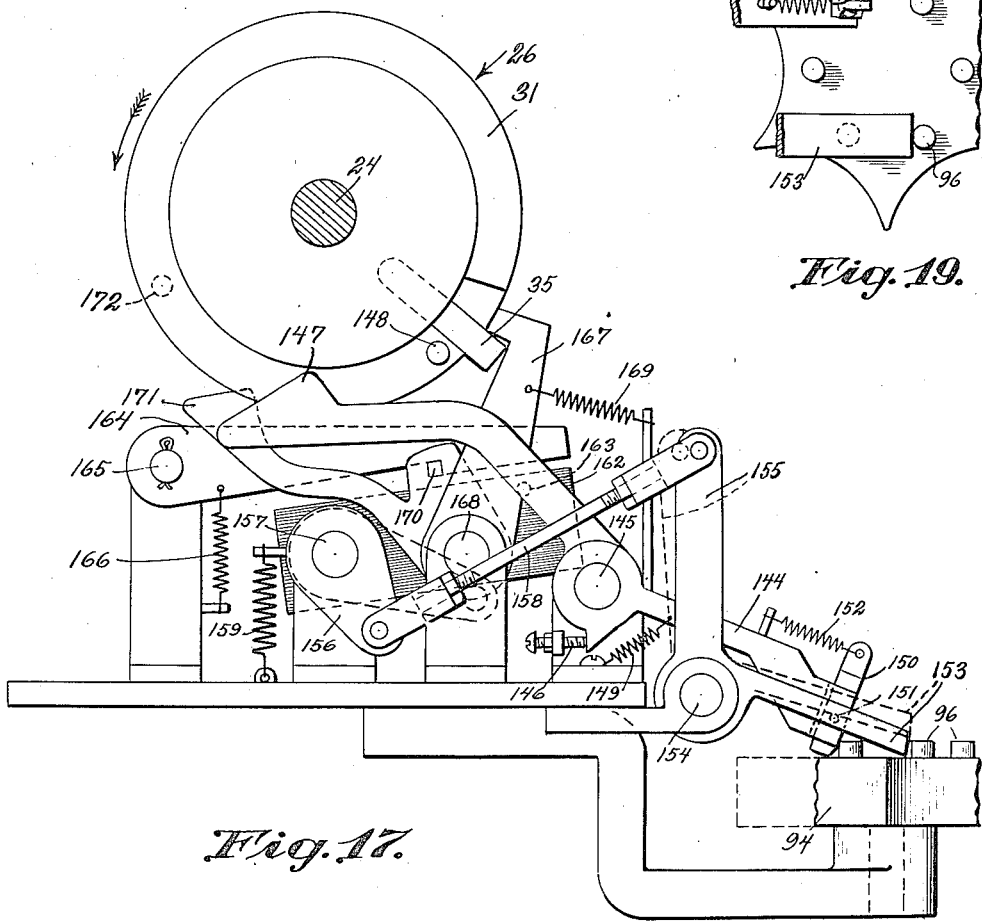
Fig. 17 is a side elevation of the star wheel controlling mechanism illustrated in Fig. 14.

In order to control and synchronize the operation of the clutch with the movement of the containers, a clutch-tripping pawl 153 is pivoted at 154 and drops between the pins 96 with each movement of the star wheel. The pawl 153 is provided with an upwardly extending arm 155 which latter is connected to an arm 156 on a shaft 157 by means of an adjustable connecting link 158. A spring 159 is secured to the arm 156 and normally maintains sufficient tension on the pawl mechanism to cause the pawl 153 to snap quickly downward between the star wheel pins 96 from the position indicated by dotted lines (Fig. 17).

An arm 160 is secured to the opposite end of the shaft 157 (Figs. 17 and 18), and provided with a pin 161 on which is supported one end of a tripper weight 162. The opposite end of this tripper weight is loosely pivoted on the shaft 157 and the outer end of the weight is arranged to be thrown upwardly with considerable force by each upward movement of the pin 161 when the pawl 153 drops between the star wheel pins 96.

The tripper weight 162 also is provided with a pin 163 which, during its upward movement, is arranged to engage a retaining latch 164 pivoted at 165, and normally pressed downwardly by a spring 166. A clutch stop member 167 is pivoted at 168 and arranged to engage the clutch pawl arm 35 of the clutch 26. A spring 169 tends to move the stop member 167 out of engagement with the clutch pawl 35. However, the clutch pawl engagement is retained, as indicated in Fig. 17, by means of a pin or tooth 170 on the pawl member 167. This pin or tooth is engaged behind a shoulder on the retaining latch 164. The clutch stop member 167 is provided with an upwardly and rearwardly extending cam arm 171 which latter is arranged to extend into the path of a pin 172 on the driven clutch member 31 when the stop member 167 is out of engagement with the clutch dog arm 35 to allow the driving engagement of the clutch.

The operation of the above described non-tripping mechanism is as follows:

When the star wheel 94 is moved by a container, the tripping pawl 153 will be raised to the dotted line position and will drop downwardly between the pins, thereby causing the tripper weight 162 to be thrown upwardly and the pin 163 thereon will strike the retaining latch 164 and release it from engagement with the pin or tooth 170 on the stop member 167. The stop member 167 will thereby be released and moved outwardly by the spring 169 to release the clutch pawl arm 35 and the driven clutch member 31 will be engaged and rotated in the direction of the arrow (Fig. 17). As the clutch rotates, the pin 172 on the driven clutch member 31 will engage the cam arm 171 and the stop member 167 will be moved again into the path of the clutch dog arm 35 and will be retained in this position by the re-engagement of the pin 170 by the retaining latch 164.

During the rotation of the driven clutch member 31 and as soon as the coupon has been inserted in the container, the pin 148 thereon will engage the cam arm 147 of the star wheel release dog 144, and will thereby momentarily raise it to allow the engaged pin to be released and the dog will then engage a succeeding pin.

During the movement of the star wheel from one pin engaged position to another, the tripping pawl 153 will move upwardly and downwardly to cause the mechanism to perform the clutch-tripping operation as previously described.

The operation of the entire mechanism is so synchronized that a continual movement of the containers past the star wheel will cause the substantially continuous operation of the machine, and the tripping and controlling mechanism will prevent the operation of the device unless a container is in a position to receive a coupon and will also prevent the insertion of more than one coupon within a single container.

Figure 20:
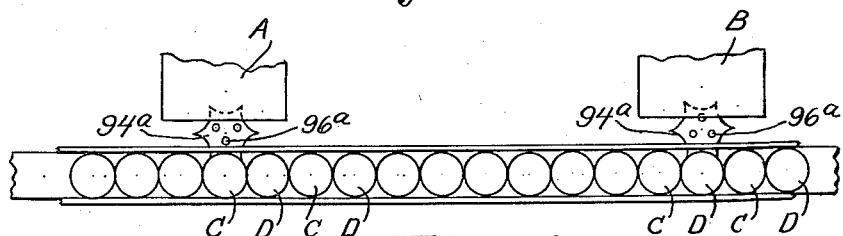
Fig. 20 is a diagrammatic top plan view illustrating means and method of associating a plurality of coupon feeding devices with a conveyor to feed coupons to selected containers.
Figure 18:
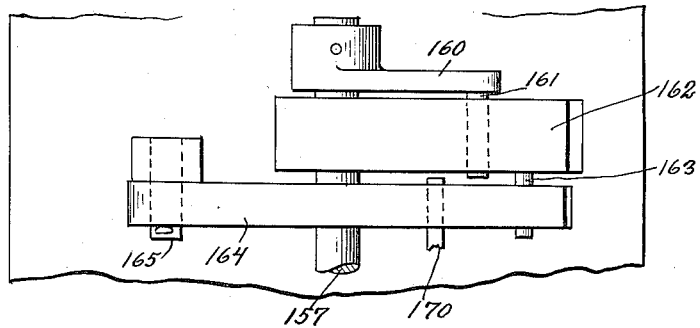
Fig. 18 is a top view of a portion of the gripping mechanism illustrated in Fig. 17.
Figure 19:
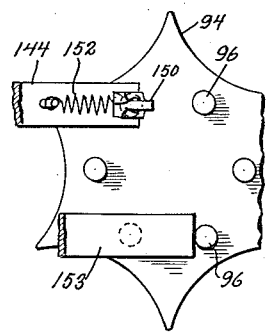
Fig. 19 is a top plan view of the star wheel dogs in engaging position.

A further valuable feature of my invention resides in the ease with which a particular association of coupon feeding devices with a conveyor as shown in Fig. 20 may be accomplished. In said figure, I have diagrammatically illustrated a conveyor along which cans are progressed and alongside of which conveyor are positioned two coupon feeding devices X and Y.

While I have, in the present application, illustrated only the two feeding devices X and Y in particular combination with a conveyor, it will be understood from a consideration of the hereafter discussion of this feature of my invention and the claims which are directed to this arrangement that, in accordance with the disclosure, any plural number of stations may be arranged to accommodate any desired speed and number of cans.

In the embodiment of the invention illustrated in Fig. 20, the first encountered coupon feeding device X supplies the coupons to the 1st, 3rd, 5th, etc., cans indicated at C, whereas the second encountered device Y feeds said coupons into the 2nd, 4th, 6th, etc., cans indicated at D, thereby permitting the cans to be progressed at twice the maximum operating speed at which the coupon feeding devices are operated.

Each of the coupon feeding mechanisms is similar to the machine previously described and includes a star wheel 94a in the concave portions of which the cans are located to rotate said wheel.

The star wheels may be identical with the star wheel 94 except that it is provided with only three stop pins 96a instead of six, alternate pins being removed. Assume now that the wheel has six pockets or reentrant concave portions, but that the stop pins 96a are removed at alternate pockets. In other words, the wheel with six can engaging portions has only three stop pins. Accordingly, when the first can encounters the wheel, the latter will be so turned that the pin associated with that particular concavity will operate the mechanism to feed a coupon into can No. 1. However, no operating pin is associated with the next concave portion so that when can No. 2 enters said last portion and moves the wheel, no associated pin is brought into operative relation with the clutch control and the can passes by without receiving a coupon.

However, the star-stop wheel of the second coupon feeding device, also provided with only three pins, is initially so set that when can No. 1 reaches it, it will contact with a concave portion with which no clutch control pin is associated, and accordingly, the first can will move said wheel without operating the coupon feeding mechanism. It will, of course, be remembered that the first can already has been provided with a coupon by the first coupon feeding device X.

The concave portion of the star wheel of the second coupon feeding device Y, which is engaged by the second can in line, is provided with an operating pin. The second can, therefore, operates the mechanism of the second coupon feeding device to insert a coupon into the second can.

Accordingly, every other can is supplied by one of the devices and the intervening and alternating cans are supplied by the second device. By utilizing above described novel combination, three feeding devices may be utilized with an appropriate change in the positioning of the pins with respect to the concave portions of suitable star wheels in the consecutively positioned devices so that the first can is supplied by the first device, the second can by the second device, and the third can by the third device.

This association of coupon feeding devices with the star wheels shown, results in a very advantageous increase in the possible speed of the can conveyor so that one conveyor may take care of a number of filling machines and a marked saving in the mechanism necessary for feeding coupons to cans running at a rapid rate.

It should be emphasized that when coupons are fed from the top of the stack by my improved device a needle or knife-edge device—as is frequently now used to hold the remaining coupons in position—is no longer required. In those mechanisms with which I am familiar and in which thin paper members, such as coupons are fed from the end of the stack, it has heretofore been necessary, in order to insure that but one coupon at a time will be withdrawn, to use a needle or other sharp member which presses against the end of the stack. The utilization of such a member has frequently resulted in tearing or otherwise distorting the coupon which is unacceptable to a large portion of the trade.

In my improved machine the operation of the turning device whereby the coupon is turned and fed to overhang the stack in position to be engaged by the feeding jaws obviates the necessity for a needle or sharp member for engaging the coupons and a marked practical advantage is obtained in the utilization of my invention.

The physical embodiments shown and described may be varied without departing from the spirit of the invention, and I desire, therefore, to be limited only by the prior art and the scope of the appended claims.

Having thus described my invention, what I claim and desire to secure by Letters Patent of the United States is:

1. The method of removing consecutive coupons from a stack and inserting them in filled containers, comprising rotating consecutive coupons in the plane of the coupon to a position to overhang the stack, then distorting the coupon while still on the stack to stiffen it, then removing the coupon from the stack, and forcing the distorted coupon longitudinally into the material in a container.

2. The method of removing coupons from a stack and inserting them in filled containers, comprising rotating consecutive coupons on the stack and in the plane of the coupon to a position to overhang the stack, engaging the overhanging portion in a manner to distort and stiffen said coupon longitudinally, and then forcing said coupon longitudinally into the material in the container.

3. The method of inserting coupons in filled containers comprising angularly displacing consecutive coupons in a horizontal plane on a stack, then engaging and distorting said coupons, then inserting said coupons longitudinally of said distortion into filled containers, and intermittently raising said stack to move consecutive coupons to substantially the same horizontal plane.

4. The method of inserting coupons in pulverulent material in containers which consists in distorting the coupons to an arcuate form sufficiently to increase their stiffness materially and then forcing them longitudinally into said material.

5. The method of inserting coupons in the material in a container which consists in withdrawing flat coupons from a stack in an arcuate form and forcing said coupons longitudinally into the material.

6. In a machine of the character described, means supporting a stack of flat coupons, means for angularly displacing consecutive coupons on said stack, means for removing said flat coupons from the stack in an arcuate form, and means for inserting said arcuate coupons in the material in filled containers.

7. In a device for automatically removing consecutive coupons from a stack and inserting them in containers, the combination with means for angularly displacing consecutive coupons on said stack and means for positioning containers of a single coupon engaging means movable between said stack and said containers to engage and distort and remove said coupons and insert them in said containers.

8. A coupon handling machine comprising a friction member, means for intermittently feeding a stack of coupons to retain consecutive coupons in position to be engaged by said friction member, means for causing said friction member to position each consecutive coupon for removal from said stack, and means for removing and simultaneously distorting each of said coupons to stiffen the same.

9. In a machine of the character described comprising a stack carrier for movably supporting a stack of coupons, the combination with a friction means for angularly positioning consecutive coupons on said stack, of a single movable clamping means for removing and simultaneously distorting said positioned coupons consecutively and inserting them in the material in filled containers.

10. A machine of the character described comprising a stack carrier for a stack of coupons, rotary friction means for angularly positioning consecutive coupons to overhang said stack in substantially horizontal plane, movable gripping means for engaging said overhanging coupons and inserting them vertically in filled containers, and means for stiffening said coupons before insertion.

11. A machine of the character described comprising a stack carrier, means for angularly positioning consecutive coupons to overhang said stack in a horizontal plane, means for gripping and simultaneously distorting said consecutively positioned coupons and inserting them in filled containers in a vertical plane, and means for synchronizing all of the operations with the movement of filled containers.

12. In a device of the character described the combination with a stack elevator for positioning successive coupons at a predetermined height, of means for angularly positioning each successive coupon to overhang said stack, a movable inserter for engaging said successively overhanging coupons and inserting them in filled containers, means to cause said inserter to engage and distort said coupons, and means to release said inserter when each coupon is inserted.

13. In a device of the character described the combination with means for angularly displacing consecutive coupons on a stack of the same, of movable means for gripping and distorting each displaced coupon, and means for causing a simultaneous rotation and bodily movement of said gripping means to insert the coupon in a container.

14. In a device for feeding coupons, a plurality of coupon feeding devices located at spaced feeding stations, a can conveyor upon which a number of cans are successively carried past said coupon feeding devices, and means controlled by the cans for causing each of said coupon feeding devices to feed coupons to selected cans whereby only one coupon is placed in a can and with the result that after the stream of cans has passed said plurality of feed devices all of the cans have been provided with coupons.

15. In a device for feeding coupons, a plurality of coupon feeding devices located at spaced feeding stations, a can conveyor upon which a number of cans are successively carried past said coupon feeding devices, and means controlled by the cans for causing each of said coupon feeding devices to feed coupons to selected cans and arranged to permit those cans which already contain coupons to pass the succeeding devices without having another coupon fed thereto.

16. In a coupon feeding device of the character described, a coupon feeding mechanism, means for moving containers consecutively past said mechanism, means controlled by said containers for affecting the said mechanism to cause coupons to be inserted in selected containers and arranged to permit containers not selected to pass without receiving coupons.

17. In a coupon feeding device of the character described, a coupon feeding mechanism, a continuously moving conveyor for moving containers past said mechanism, and means controlled by said containers to cause said mechanism to insert coupons into selected containers only and arranged to permit other containers to pass without coupons.

18. In a coupon feeding assembly of the character described, a plurality of coupon feeding mechanisms, means for moving containers past said mechanisms, means cooperating with each mechanism and controlled by said containers to cause each mechanism to insert a coupon in alternate containers.

19. A device for transferring coupons from a stack into the material in filled containers, comprising a gripper reciprocable between said stack and said containers, and means for moving consecutive coupons into the path of said gripper.

20. A device for transferring unfolded coupons from a stack into containers, comprising means for moving a coupon out of alignment on said stack, means for positioning a container, and a coupon carrier reciprocable between said stack and said container for transferring said coupon from said stack to said container, said carrier being arranged to maintain said coupon unfolded and semi-rigid during transfer.

21. A coupon handling machine comprising means for positioning consecutive coupons for individual engagement, means for positioning containers to receive said coupons, and a pivoted arm having means thereon for engaging the coupons and moving them into said containers, the pivotal axis of said arm being movable during insertion of a coupon to cause said coupon to move into a container in a substantially straight line.

22. The method of inserting coupons into material in containers which consists in bending each coupon sufficiently to stiffen it without permanent folding and then forcing the stiffened coupon into the material.

23. A device for inserting coupons into material in containers comprising means for bending each coupon sufficiently to stiffen it without permanent folding and means to force said stiffened coupon into the material.

JOSEPHUS J. THAYER.